US006179161B1

(12) United States Patent
Kovens et al.

(10) Patent No.: US 6,179,161 B1
(45) Date of Patent: Jan. 30, 2001

(54) CONVERTIBLE FRONT LOADING FLAT ARTICLE VENDING MACHINE SYSTEM

(75) Inventors: Steven A. Kovens, Owings Mills; Michael T. Gootee, Baltimore; Robert H. Tegtmeier, Phoenix, all of MD (US); Ronald F. Deuel, Shrewsbury, PA (US); Wayne Mincher, Towson, MD (US)

(73) Assignee: Parkway Machine Corporation, Timonium, MD (US)

( * ) Notice: Under 35 U.S.C. 154(b), the term of this patent shall be extended for 0 days.

(21) Appl. No.: 09/191,525

(22) Filed: Nov. 13, 1998

(51) Int. Cl.$^{7}$ .................................................... B65G 59/00
(52) U.S. Cl. ............................................ 221/131; 221/155
(58) Field of Search ............................. 221/155, 24, 129, 221/131, 268, 272, 232, 7, 13

(56) References Cited

U.S. PATENT DOCUMENTS

| | | | |
|---|---|---|---|
| 2,305,342 | 12/1942 | Fry | 312/55 |
| 3,073,481 | 1/1963 | Steiner | 221/152 |
| 3,790,027 | 2/1974 | Barnhart | 221/274 |
| 4,168,784 | 9/1979 | Heir | 221/125 |
| 4,285,443 | 8/1981 | Winans | 221/155 |
| 4,702,392 | 10/1987 | Rachman | 221/151 |
| 4,919,250 * | 4/1990 | Olson et al. | 221/155 |
| 5,195,653 | 3/1993 | Gerrans | 221/274 |
| 5,301,834 | 4/1994 | Lee et al. | 221/129 |
| 5,505,333 | 4/1996 | Shibazaki | 221/155 |
| 5,743,429 | 4/1998 | Morofsky | 221/7 |
| 5,823,386 | 10/1998 | Vanderberg | 221/2 |

FOREIGN PATENT DOCUMENTS

WO 90/01765 2/1990 (WO) .

* cited by examiner

*Primary Examiner*—Kenneth W. Noland
(74) *Attorney, Agent, or Firm*—Cahn & Samuels, LLP

(57) ABSTRACT

A flat article vending machine capable of mechanical or electronic actuation and which provides for convertibility using modular actuation assemblies, has replaceable chimney hopper modules, an anti vandalism gate, and a pocket display panel assembly, and is front loading.

25 Claims, 9 Drawing Sheets

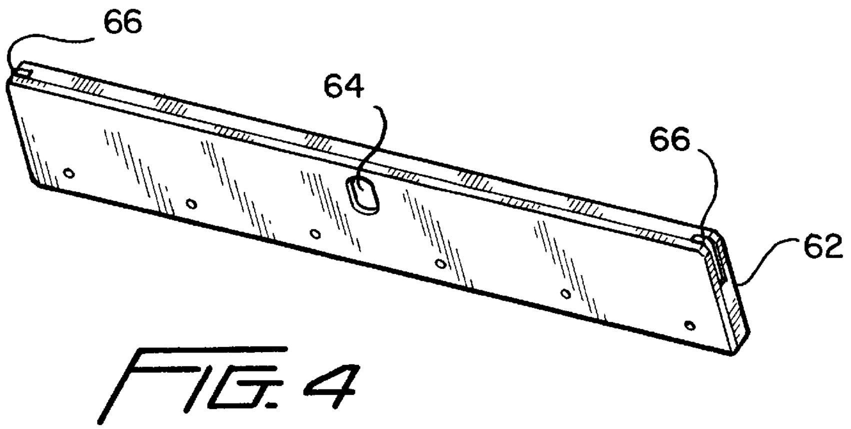
FIG. 4
FIG. 5
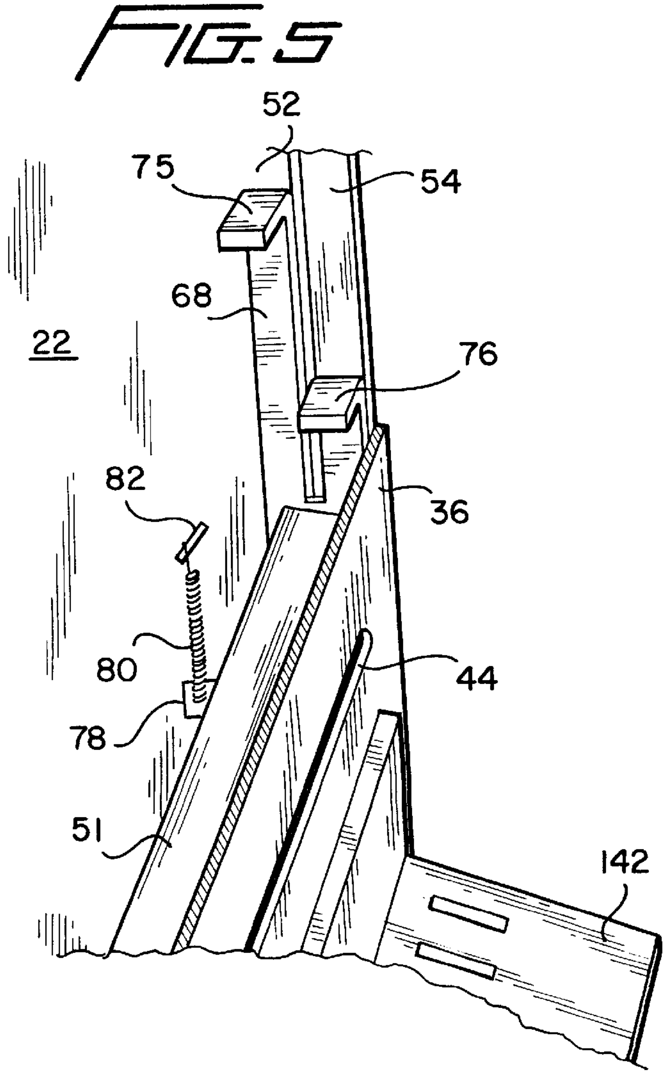
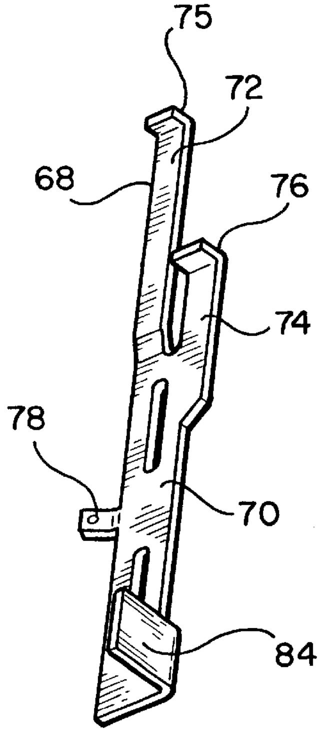
FIG. 6

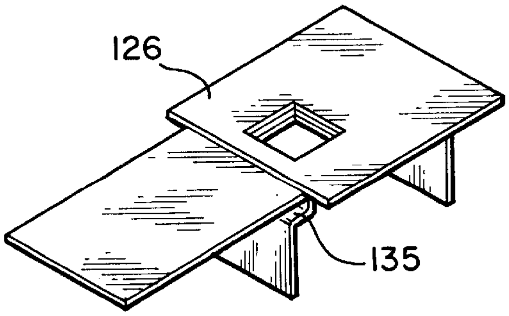
FIG. 12
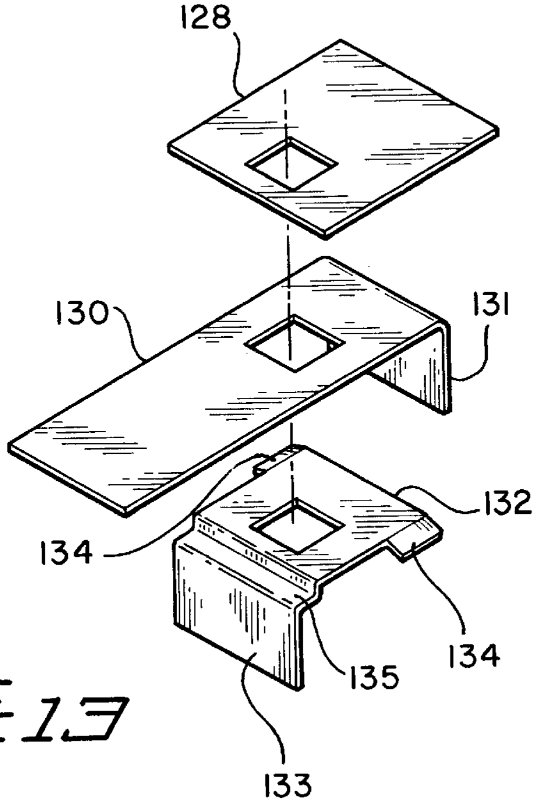
FIG. 13
FIG. 14
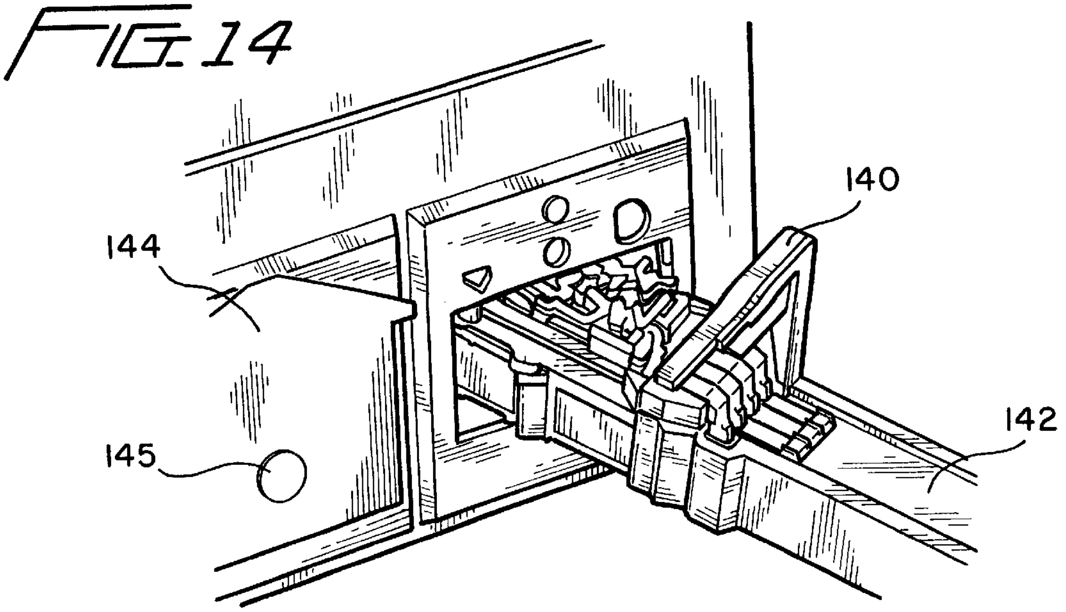

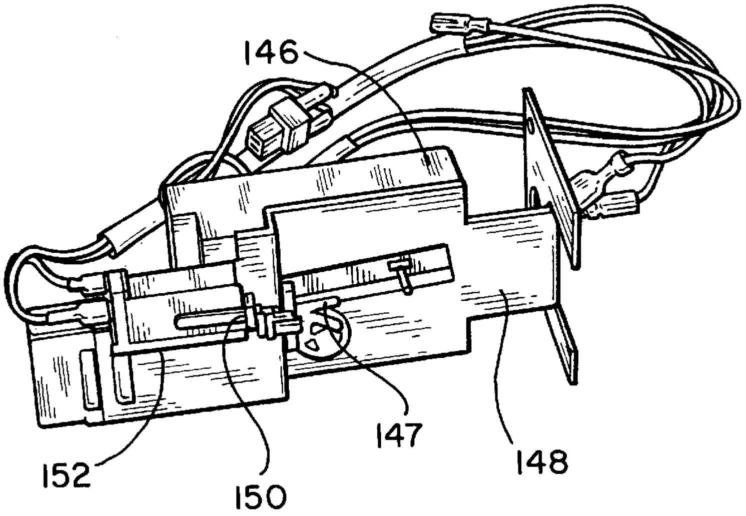
FIG. 15
FIG. 16
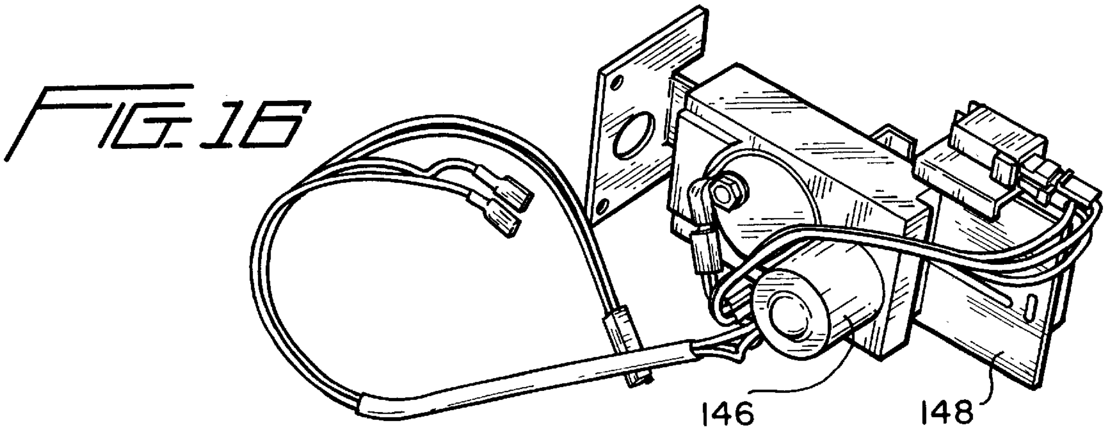
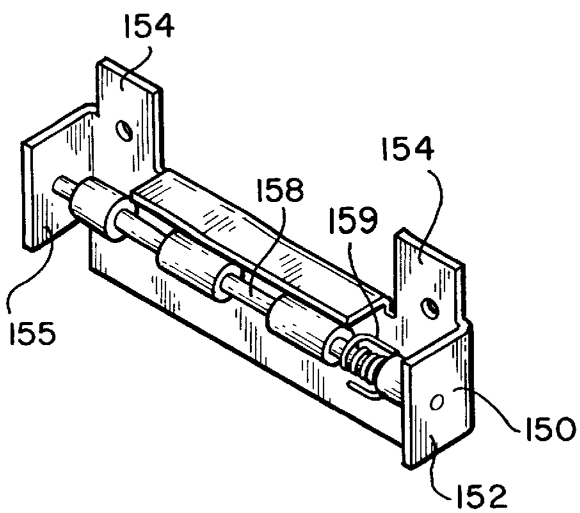
FIG. 17

FIG. 18
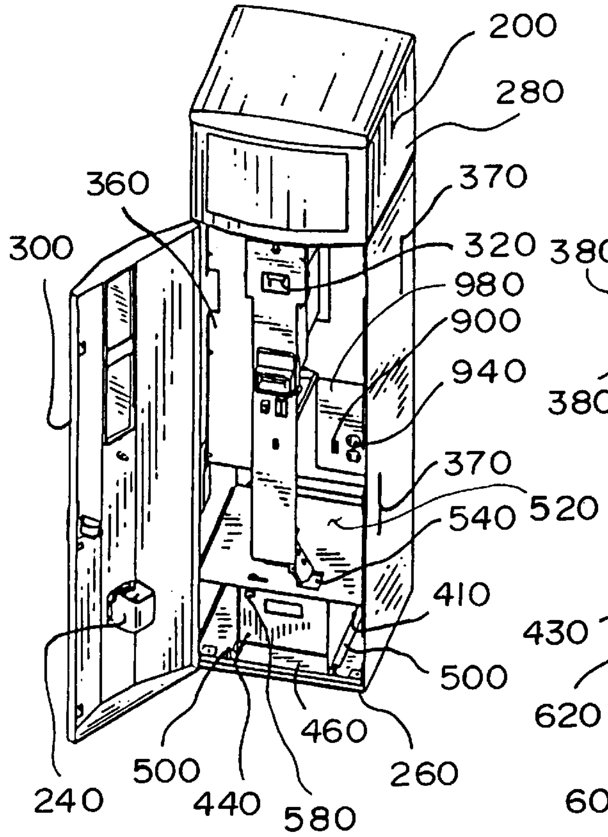
FIG. 19
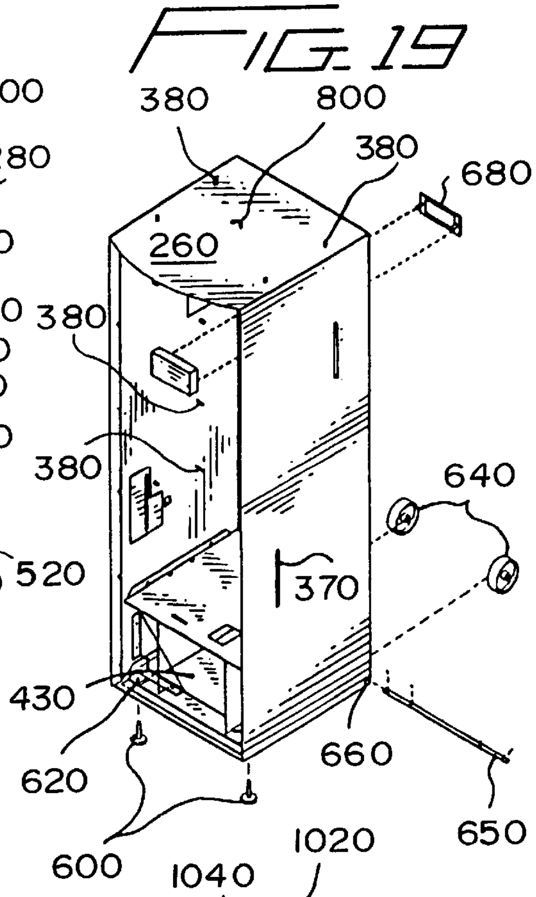
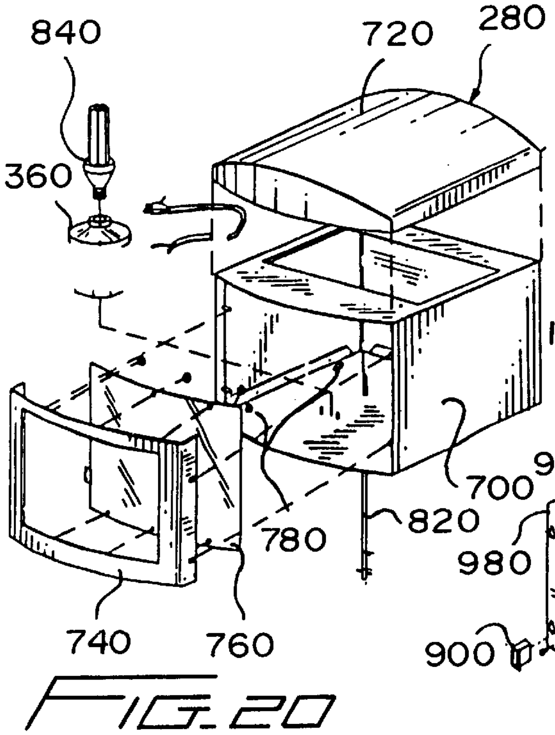
FIG. 20
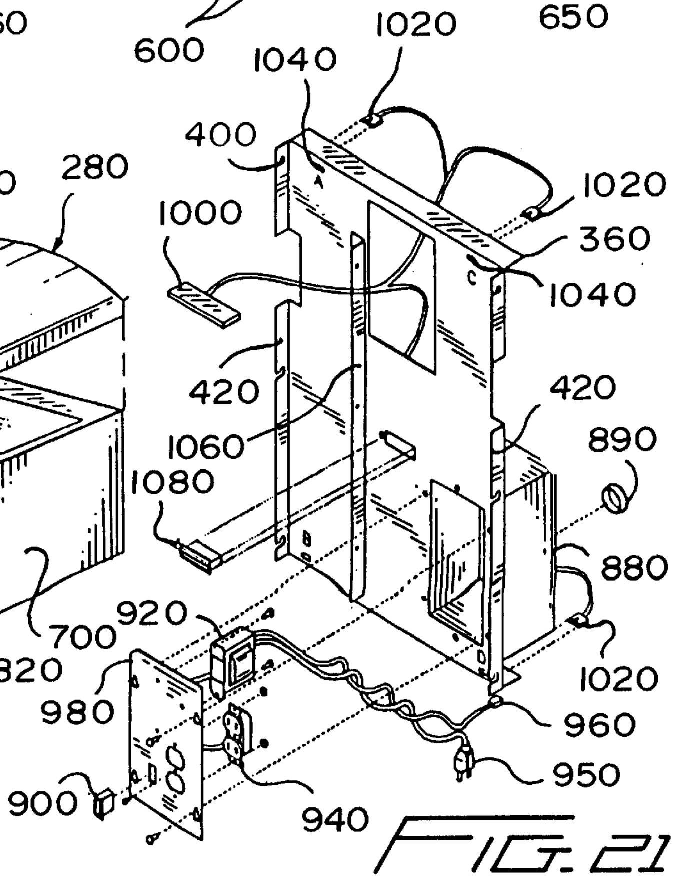
FIG. 21

CONVERTIBLE FRONT LOADING FLAT ARTICLE VENDING MACHINE SYSTEM

TECHNICAL FIELD

The present invention is directed to improvements in flat article vending systems, assemblies and methodologies. More particularly, the invention relates to a vending machine for vending flat articles such as stickers, cards, photographs and the like.

BACKGROUND OF THE INVENTION

Flat article vending machines of the type used to vend cards stickers, photographs and laminates typically are found in public locations such as stores, malls, etc. Flat article vending machines of conventional design are represented by U.S. Pat. No. 2,305,342 (Fry), U.S. Pat. No. 4,702,392 (Rachman), and U.S. Pat. No. 4,168,784 (Heier). Such machines comprise a cabinet with principal operational segments, a base enclosing one or more flat article storage hoppers and supporting the vend actuation mechanism (coin slide and ejector), an actuator (coin slide), a vended article outlet, and a display.

Conventional cabinets are formed from metal and include at least one compartment to accommodate the card-containing hopper which is typically seated on a tray associated with the dispensing actuator. The dispensing actuator embodies a retractable, spring actuated plate plunger that is designed to engage the edge of one flat article and force it through a corresponding slot in the from of the machine. The dispensing actuator is linked to an actuator enabler such as a coin slide that is mounted on the front of the cabinet which, upon deposit of appropriate coinage, releases a locking assembly to permit the plate plunger to be retracted and translated forwardly to push the flat article through the vending slot. The most common actuator enabler is a coin slide underlying dispensing opening and operatively engaged with the plate-plunger. The above-identified Rachman patent discloses a vending machine relying on a crank handle coin mechanism typically associated with conventional bulk vending machines. The actuating rotational force provided by a crank handle is converted to a translating force to cause reciprocation of the plunger and, consequently, vending of the flat article.

The idea of a flat article vending machine which provides convertibility between mechanical and electronically controlled vending, as well as a machine that permits cartridge style loading from the machine front, as well as facilitating display panel changes and which permits single machine or rack combination on racks with other machines (of the same or different types) appears to have escaped the industry.

SUMMARY OF THE INVENTION

It is therefore an object of the present invention to provide a vending machine assembly and methodology that improves upon and overcomes the problems known in the flat article vending art.

It is another object of the invention to provide an improved currency operated flat article vending machine.

Still another object of the present invention is to provide a flat article vending machine convertible between currency-enabled, mechanical and electronic actuation while being capable of stand-alone and rack system use.

Still another object of the invention is to provide a flat article vending machine that is integral and provides for multiple products to be vended.

Another object of this invention is to provide a restocking capability that relies on front loading of flat articles into chimney type hoppers structured to enhance proper stacking alignment and to reduce operator labor.

These and other objects are satisfied by a flat article vending machine, comprising a cabinet defining an interior of selected dimensions bordered by a base, top, side walls, and an apertured actuator receiving panel adapted to receive and retain at least one vending actuator, said apertured panel being located proximate to said cabinet base and containing at least one vending slot and a pivotable door;

a panel receiving and securing guide disposed in the interior of said cabinet on at least one of said side walls, said panel guide being disposed and extending above said apertured panel;

a retractable locking arm slidable between a depressed locking position and a raised unlocked position, said locking arm being located below said panel receiving and securing guide and behind said apertured panel, said slidable locking arm lockingly engageable with said pivotable door; and a removable panel lockable to said cabinet of dimensions selected to abut said side walls, said top, and said apertured panel, said removable panel having a lower edge that is receivable in said panel receiving and retaining guide and translatable to abut and coact with said slidable locking arm and lockingly engage said pivotal door.

Further objects of the present invention are satisfied by a pre-loadable magazine for a flat article dispensing machine, comprising, a chimney hopper having an upper loading zone, a middle storage and retention zone, and a lower dispensing zone, said chimney being defined by two opposing side panels, each side panel including a turn in to define a column of selected geometric cross-section for nesting a plurality of stacked flat articles;

said middle storage and retention zone of said column restricting lateral movement of said flat articles retained therein;

said upper loading zone having defining a beveled front opening formed by two opposing sides, each side incorporating a flared turn out flange bordering said beveled front opening where said upper loading zone facilitates front loading and stacking alignment of flat articles in said chimney hopper; and said lower dispensing zone including an opening for permitting flat articles to exit the chimney hopper laterally upon application of laterally directed force.

Still other objects of the present invention are satisfied by an electronic flat article vending machine assembly, comprising:

a cabinet defining an interior of selected dimensions bordered by a base, top, is and side walls, an apertured actuator receiving panel adapted to receive and retain at least one electrically actuated vending actuator; and a vending slot;

a hopper means for storing flat articles located in the cabinet interior;

a reciprocating electrical vending actuating assembly including a reciprocating plunger disposed within said cabinet relative to said hopper means to push a flat article from the hopper to the vending slot; and a control unit for transmitting an electronic actuation signal to the electrical vending actuation assembly, said control unit being in electronic communication with said cabinet.

The flat article vending machine assembly provided by this invention improves operator choice, flexibility, vending option selections, and reliability while minimizing the labor and time required for inventory replacement and to maintain multiple machines in good working order.

As used herein, "flat article vending machine" is intended to embrace its ordinary meaning and in the context of the instant invention, allows for variations and deviations from same which may occur by design or as a result of special features, machining, materials, and other variables. The expression is intended to define the functionality where the storage and dispensing of a type of unique vended item occurs from a unique machine with a pre-established price and which is actuated upon the deposit of the appropriate coinage.

Correspondingly, the expression "flat-article" is intended to embrace a functionality beyond dictionary definitions and embrace not only cards, stickers, and the like but also larger flat items such as books or boxed items.

Given the following enabling description of the drawings, the inventive coin operated bulk vending assembly and system and the scope of the invention should become evident to a person of ordinary skill in the art.

BRIEF DESCRIPTION OF THE DRAWINGS

FIG. 4 is a perspective view of coin box door of the embodiment depicted in FIG. 1.

FIG. 5 is a partial perspective view of the lockbar and cabinet in assembly in accordance with the invention.

FIG. 6 is an elevation view of a lockbar in accordance with the invention.

FIG. 12 is a perspective view of an actuator pusher plate assembly adapted to cooperate with the tray depicted in FIG. 11.

FIG. 13 is an assembly view of an actuator pusher plate assembly depicted in FIG. 12.

FIG. 14 is a perspective photographic view of a combination version a flat article vendor according to the invention incorporating a displaced coin slide mechanism and the front of an indicator- containing electronically actuated dispensing mechanism.

FIG. 15 is a top photographic view of an electrically actuated drive motor and motor bracket assembly for affixing to a cabinet as depicted in FIG. 14.

FIG. 16 is a bottom photographic view of an electrically actuated motor, rotation-to-reciprocating drive arm, and motor bracket assembly as depicted in FIG. 15.

FIG. 17 is a perspective view of an anti-tamper pivotal slot cover assembly for use in the invention.

FIG. 18 is a perspective view of a central control unit embodiment according to an electronic version of the invention.

FIG. 19 is an exploded assembly view of the control unit cabinet base of the central control unit embodiment according to the embodiment of the invention depicted in FIG. 18.

FIG. 20 is an exploded assembly view of the control unit cabinet top of the central control unit embodiment according to the embodiment of the invention depicted in FIG. 18.

FIG. 21 is an assembly view of control unit mounting panel for mounting in the cabinet base of the central control unit embodiment according to the embodiment of the invention depicted in FIG. 18.

DETAILED DESCRIPTION OF THE ILLUSTRATED EMBODIMENT

Figure 1:
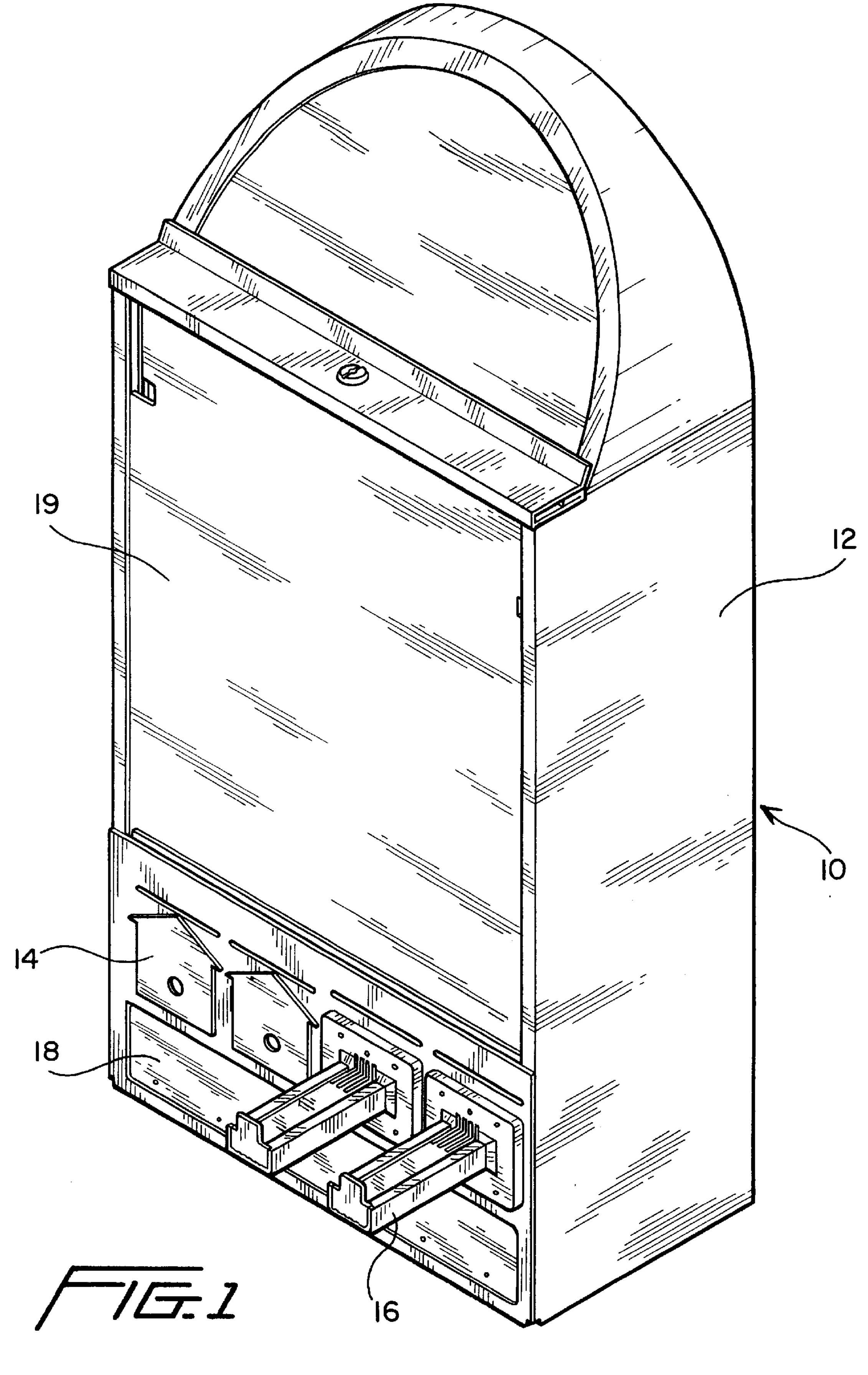
FIG. 1 is a front perspective view of a flat article vending machine assembly embodiment according to the invention.

FIG. 1 depicts a sticker vending machine 10 in accordance with the invention. Sticker vending machine 10 comprises cabinet 12, actuators 14 and 16 (electric and mechanical, respectively), a coin box drawer 18, a front display panel assembly 19, and a dome 20.

Figure 2:
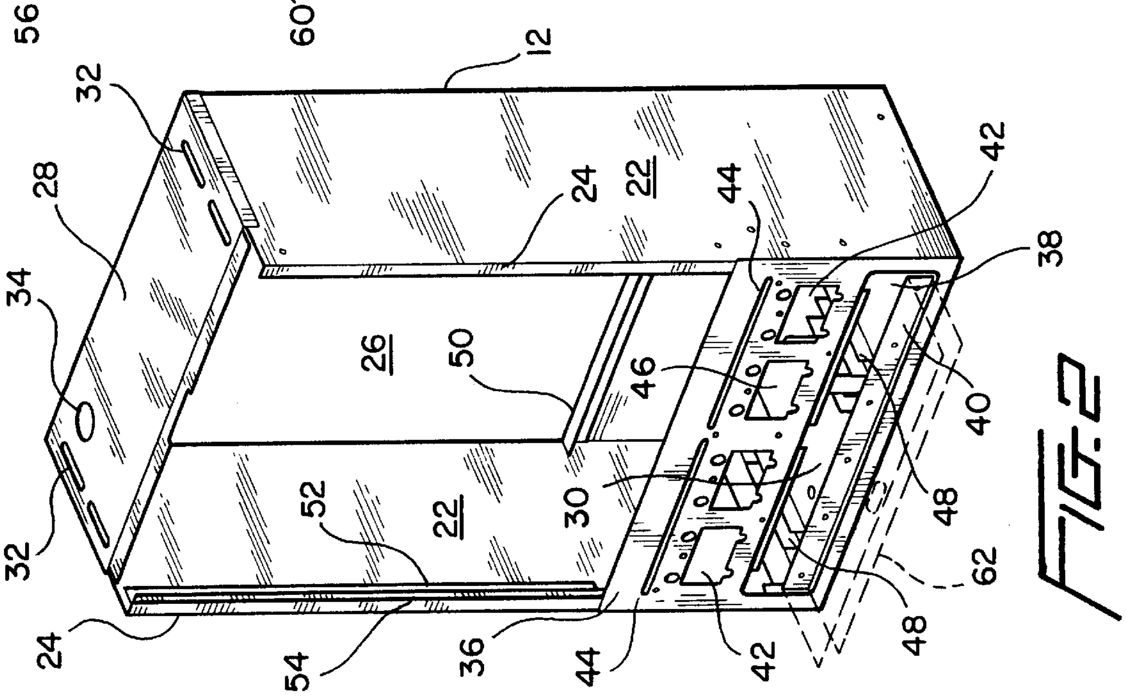
FIG. 2 is an assembly view of the cabinet of the embodiment depicted in FIG. 1.

In FIG. 2, a standard four dispenser, open front, cabinet 12 is depicted. The cabinet 12 features side walls 22 with front turn-in flange 24 preferably extending the entire length of the cabinet, rear wall 26, top panel 28 and a bottom plate 30 establishing the base of the cabinet. The top panel 28 features a series of longitudinal set slots 32 and feedthrough 34 for communicating wires, etc, from the cabinet interior to the top. A steel lock reinforcement plate is secured near the center at the front of panel 28

An L-shaped actuator base panel comprises front actuator base support plate 36 and a bottom plate 30 is attached, preferably welded, to the turn-in flanges 24. A coin box opening 38 extends across the bottom portion of the actuator base plate 36 and incorporates along its lower border, coin box door piano hinge 40 adapted to pivot outwardly from the opening. Four dispensing actuator apertures 42 are spaced laterally across the front of the base plate 36. Each of two elongated sticker vending slots 44 are disposed, respectively, above two of the actuator apertures 42, one on the left and one on the right. A panel reinforcing, hopper tray support having an L-shaped cross-section 51 (see FIG. 5) is spot welded on the back of the base panel 36 between the vending slots 44 and the actuator apertures 42. A vertical reinforcing support is welded to the back of the base plate 36 at approximately its mid-line and along the bisector of the upper surface of the bottom plate 30. Coin box support guides 48 are also welded to the upper surface of bottom plate 30 which also features selected screw holes and feedthroughs for mounting on a vending machine rack or stand, if desired.

An L-shaped, rear hopper tray angle bracket 50 is welded to the front face of the rear cabinet wall 26 and is juxtaposed to cooperate with the corresponding front support angle bracket 51 to support a hopper tray shelf. Welded along the interior of each of side walls 22, above the actuator panel 36 and both parallel to and adjacent to but spaced apart front turn-in flanges 24 are metal L-shaped guide rails 52. The guide rails 52 cooperate with the front turn-ins to form opposing front panel receiving channels 54.

Figure 3:
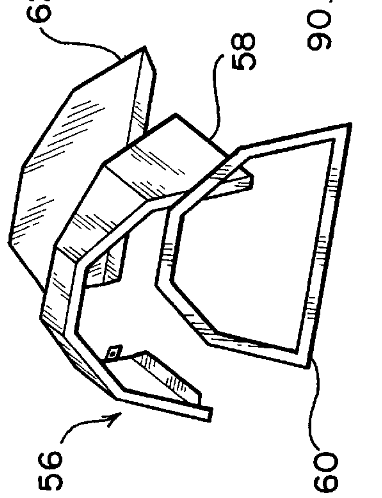
FIG. 3 is a perspective view of a top dome module according to the embodiment depicted in FIG. 1.

Referring to FIG. 3, it illustrates a geometrically configured cabinet dome module 56 for seating on the top of the cabinet 12. The module 56 is comprised of, a main body section 58 defining a selected peripheral configuration. Attached to the main body is a front display panel 60 defining a corresponding peripheral configuration to that of the main body. A rear dome panel 62 is attached to the main body. As illustrated, in FIG. 1, the cabinet dome is seated on the cabinet 12 by mounting assembly 56 on the top plate 28 by insertion of locking tabs through slots 32. The dome is hollow so that it can incorporate electrical backlighting of a translucent advertising/identifying panel retained by the display panel 60.

Referring to FIG. 4, a cash box door 62 is pivotally mounted along the bottom of the cabinet 12 by hinge 40. The cash box door is 62 sized to cover and secure opening 38 and features a combination locking system including barrel lock receiving feedthrough 64 for seating a conventional barrel lock (not illustrated) and lock bar receiving slots 66. The lockbar 68, as depicted in FIG. 5 and its assembly as depicted in FIG. 6, is dimensioned to reciprocate in the channels 54. The lockbar includes a flat body 70, a pair of parallel, upwardly projecting arms, guide arm 72 and plunger arm 74. The guide arm 72 slides along the back side of the guide rail 52 and the plunger arm 74 slides within the channel 54. Guide arm 72 includes a short leg 75 projecting interiorly which rests against the guide rail surface and assists, during translation of the lockbar 68 with vertical stabilization. A bend 76 projects perpendicularly to arm 74 at its top that serves as a plunger shelf, as described below. A spring attachment lug 78 flares inwardly from about the vertical bisector of the body 70 which connects spring 80 to a lug 82 located on the interior of cabinet wall 22. The lockbar 68, by this connection is spring biased in the illustrated, raised position. The lower end of the lockbar 68 includes guillotine bar 84 which projects interiorly from the body 70 and is sized to slide in and lockingly cooperate with one of the cash door slots 66 when lockbar 68 is in the lowered, locking position.

In the preferred mechanical embodiment which incorporates a cash door 62, lockbar assemblies are provided on both sides of the cabinet. By providing the above-described cooperating multiple lockbar and barrel lock locking arrangement the coins/currency contained in the interior cash box is protected from theft and the security of the cash box door 62 is reinforced.

Figure 7:
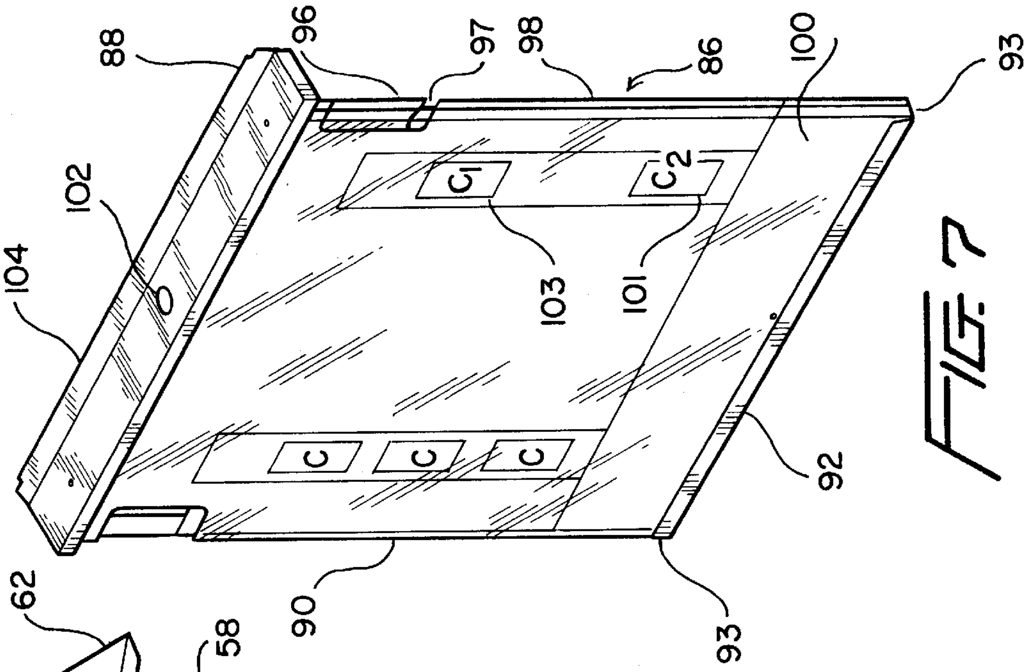
FIG. 7 is an assembly view of the front display panel and locking top bar of the embodiment depicted in FIG. 1.

As illustrated in FIG. 7, the front panel 86 is securable on the front of the cabinet 12 using guide channels and engaging a lock associated with the locking top bar 88 with the top plate 28 of the cabinet 12. The panel 86 includes a metal back plate 90 including a forwardly projecting bracket 92 having end notches 93 formed along its lower edge. The notches are adapted to slide in the channels 52 and to abut the plunger shelf 76 of the locking bar 68. The edges of the upper portion of plate 90 include guide-engaging tabs 96 which define a guide rail receiving recess 97. The recess 97 has a thickness substantially equaling the thickness of the guide bar 52 and a depth sufficient to accommodate same. The front panel 86 is installed on the cabinet 12 by sliding it downwardly until completely seated with notches 93 constrained within the guide channels 54 and with the tabs 96 abutting the back side of the guide rail 52. The height of the panel 86 corresponds to the length of the guide channel so that the notches 93 engage the lockbar plunger shelf 92 overcoming the spring force, thereby depressing the lockbar to cause the guillotine 84 to slide into the coin door slots 66. Simultaneously, the top bar 88 contactingly confronts the cabinet top 28 thereby seating the display panel assembly on the machine front. The top bar 88 includes a flange 104 that is adapted to lie across the front edge of the upper dome member 20 to minimize vandalism thereto.

The display panel assembly includes a clear, polymeric (polystyrene, plexiglass, polycarbonate) display cover 98 that seats in the bottom groove established by the shelf 92 which is easily separable from the panel when in the unsecured position. The display cover 98 is slightly longer (i.e., 3/16 inch) than the distance between the bottom of the top bar 88 and the top of the display support shelf 92. Thus, by slightly bending the display panel 98, it slides under the top lock bar 88, snapping onto the back plate 90 and is secured thereto by means of a clamping interference fit. When the display assembly 86 is properly seated on the front of the cabinet and locked to the cabinet top with a barrel lock (not illustrated) that is affixed through lock feedthrough 102, the edges of the display cover 98 are recessed within the perimeter of the cabinet 12.

In the preferred embodiment, the display panel assembly features a plastic strip forming retaining pocket 100 attached to the display cover 98 which permit selective positioning of sticker/card display columns 101. Preferably, there is one display column 101 associated with each dispensing actuator where the displayed items 103 mounted thereon correspond to the content of the actual flat articles (e.g., stickers, cards, etc.) dispensed from that actuator. It should be readily apparent that the display assembly provides for easy repositioning and substitution of the display items 103. Alternative display attachment schemes can include the use of double-sided adhesive display strips mounted on the front of the metal panel 90 or even providing a layer of low tack adhesive for substitution/removable positioning of display sticker or cards. Thus, during maintenance and machine restocking when the front panel assembly 19 is unlocked and released from its track within the cabinet 12, the operator can access the edges of the display window to pop it out of and release the window 98 from the panel 90 to change the display to include new items and remove discontinued items.

Figure 8:
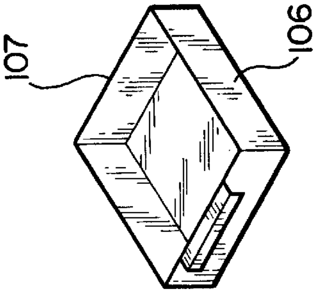
FIG. 8 is a perspective view of a cash box in accordance with the invention.

Having reviewed the principal aspects of the illustrated embodiment of the novel flat article vendor cabinet 12 according to the invention, the interior components and operation are now described. An exemplary cash box 106 is illustrated in FIG. 8. As illustrated, the cash box 106 includes a catch lip 107 to contact the interior of panel 36 and to prevent complete direct, straight motion extraction of the cash box 106 from the cabinet. Excluding the lip 107, the height of the cash box 106 provides for easy translation through the coin box opening 38 when the coin box door 62 is open (only possible when the front panel is removed to release the locking bars 68). The coin box is sized to underlie each half of the coin box compartment divided by the vertical support 46. Each coin box is seated on and between the coin box guides 48 attached to the floor of the cabinet.

Figure 9:
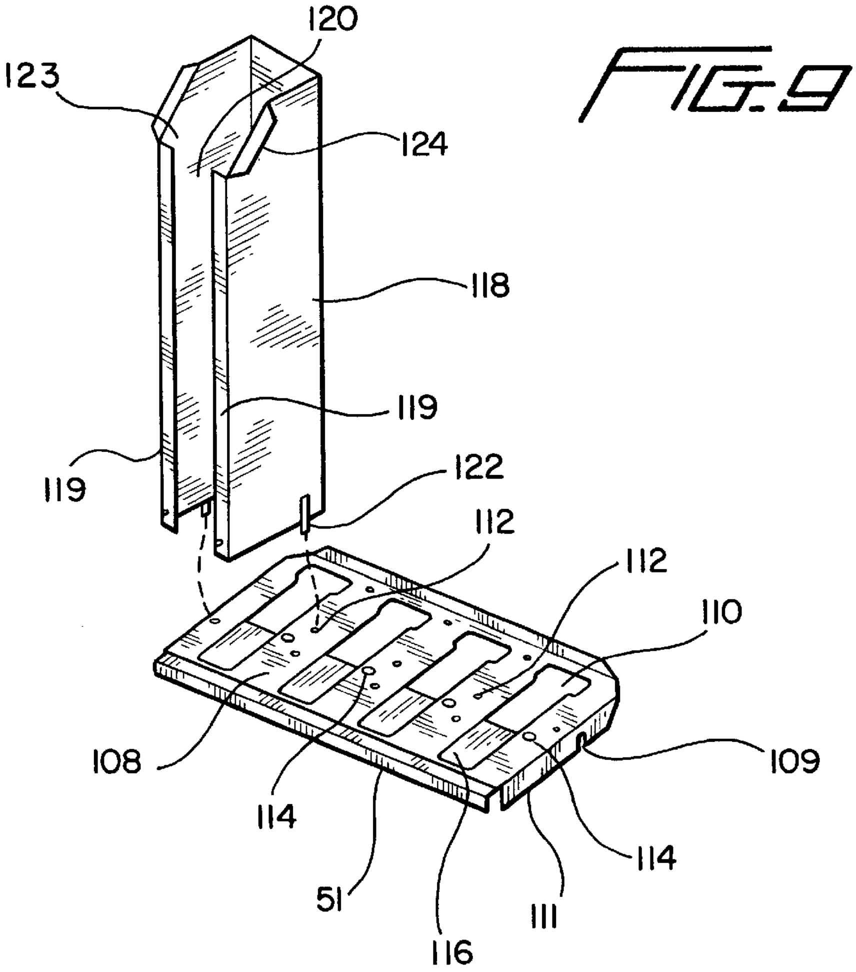
FIG. 9 is an assembly view of a version of a sticker chimney hopper and tray assembly according to the invention.
Figure 10:
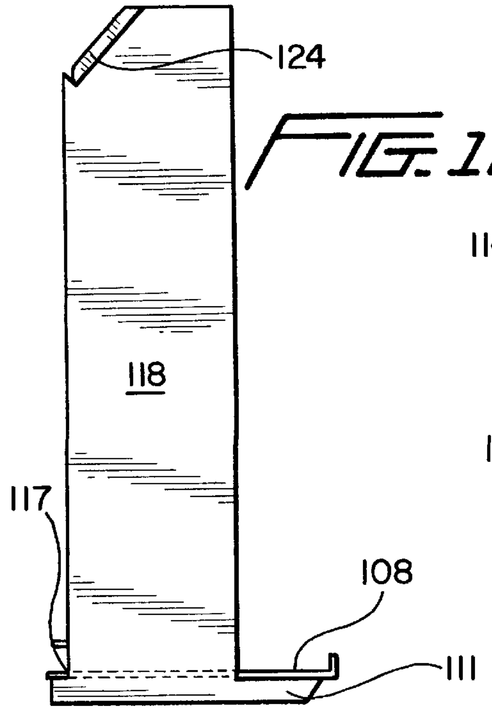
FIG. 10 is a side view of the chimney hopper in accordance with the embodiment of the invention depicted in FIG. 9.
Figure 11:
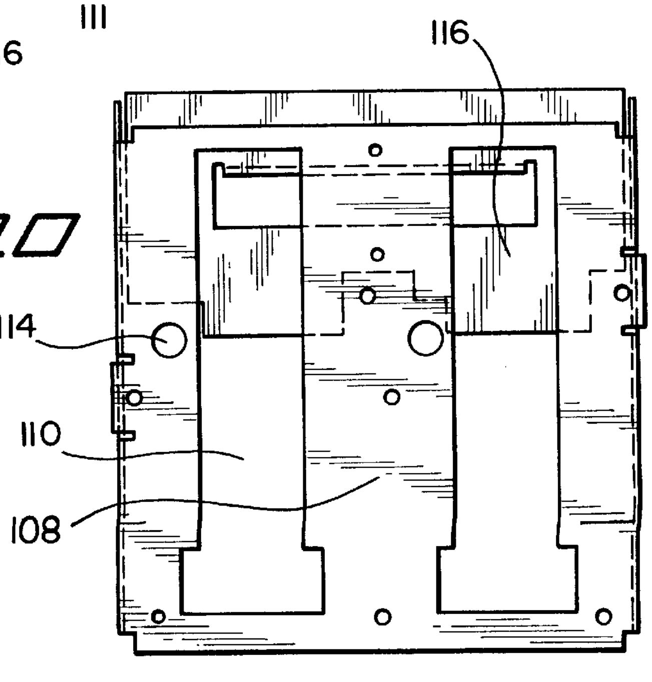
FIG. 11 is a top view of a two-slot version of a chimney hopper and tray assembly in accordance with the embodiment of the invention depicted in FIG. 9.

Turning to the flat article hopper assembly illustrated in FIG. 9, it represents is the pin mounted embodiment of a multi-apertured hopper support and actuation tray 108. The tray 108 conforms to the interior cross-sectional dimensions of a four-actuator cabinet 12 and has selected slots 109 formed in descending bends 111 defining the side edges which are adapted to sit on alignment pins projecting interiorly of the cabinet 12 and also to sit on the vertical support 46. This illustrated four-slotted member the tray 108 spanning the entire interior of the cabinet. The preferred version of the tray 108 contains two vending apertures 110 and is adapted for modular assembly. The two-apertured modular version illustrated in FIGS. 10 and 11, is adapted to seat on supporting angle brackets 50 and 51 (see FIGS. 2 and 5). However, in the case of a modular system, it can be divided into four separate abutting units or the slot size varied to accommodate larger items (e.g. 1 large and 2 standard, 2 large, etc.).

Regardless of the particular mounting detail, the tray 108 features T-shaped apertures 110 that cooperate with the below-described vending actuation assembly. Each of the T shaped slots have positioning pin receiving holes 112 and a sensor aperture 114 that accommodates either a physically invasive pin sensor or an electro-optic sensor for sensing the presence of a flat article on the tray. Welded on the bottom of the tray 108 is a reinforcing and stop plate 116 that underlies a select length of the T slots 110 serving as a stop for the actuator. The stop plate 116 also supports the slide 126 to prevent tipping or misalignment during vending.

The chimney hopper 118 of the invention defines three sides and an open front bordered by opposed side wall bends 119. As illustrated, the chimney provides a generally rectangular column 120 and defines three functional zones. The upper zone is for loading and stacking, the middle zone retains and stores the stacked articles and the lower zone provides for removable attachment and article dispensing in conjunction with the underlying tray 108. The chimney hopper is seated on the tray 108 via engagement of the threaded positioning pins 122 into corresponding holes 112 in the tray 108. The column 120 is seated directly over an underlying T-slot and permits communication of stacked flat articles contained in the hopper to the actuation slot. Notches 117 are located at the bottom of the bends 119 to allow for forward exit of a flat article from the chimney hopper. The middle storage/retaining zone provides for uniform stepwise decent of stacked articles from the chimney top to a dispensing opening in communication with the underlying tray. As an article is vended from the bottom of the stack, the stack height decreases by the width of the article causing the next lowest article to move into the bottommost, vending position.

The upper stacking zone features a fully open, beveled front section 123 bordered by outwardly flaring stacking guides 124. Upon access to the chimney hopper (by opening the front panel). The chimney 118 is attached to the tray 108 so that the operator can either remove the entire assembly for remote refilling, e.g., back at the business, or may introduce a new supply of flat articles to the top of the existing stack in the chimney hopper column 120. Factory/remote refilling permits for faster on-site stocking permitting the operator to substitute a fully pre-loaded module for the empty or partially vended hopper. However, where on sight filling is employed, the flaring guides 124 and beveled front 123 of the chimney facilitate refilling by minimizing the need to carefully lower the stack into the hopper as would be required by prior art devices.

The vending actuation assembly is now described. The reciprocating actuation plunger assembly 126 includes a card stack support plate 128, a guide plate 130 having a depending bend 131, and a lower stop plate, with a forwardly disposed depending bend 133 and wing tabs 134. The assembly, based on its function is constructed of a heavy gauge metal (or equivalent material). The side edges of the upper plate 128 and the wing tabs 134 of the lower plate cooperate to form a recesses of a width corresponding to the thickness of the tray 108. The plunger assembly 126 is installed by sliding it forwardly from the top of the T of the T-slot 110 where the edges of the T-slot are slidingly received in the recess. The forward motion of the plunger assembly is limited by confronting engagement of the rearward edge of the stop plate 116 with the stop notch 135 formed on the forward face of the depending bend 133. Preferably, the actuator plunger plate has a thickness slightly less than the flat articles being vended. Due to the ease of installation, the operator may change plunger actuators in order to conform to the thickness of selected vended items from a particular chimney. (Correspondingly, the chimney hopper may be substituted to provide a notch 117 of adequate height to accommodate the article thickness.)

The actuation plunger assembly is operatively connected with an underlying actuator. A conventional coin slide actuator of the type found in coin-operated washing machines can be used. In FIGS. 15, and 14, the illustrated embodiments depict vertical coin slides (e.g., models Vertical 4 or Vertical 5 available from ESD of Fort Washington, Pa. and the Vertical 5 available from Greenwald Industries, Inc. of Chester Conn., see also U.S. Pat. No. 3,712,440 and 5,529,162). The coin slide 16 is front loaded through the actuator aperture 42 and includes a vertically projecting pusher plate which engages descending plate 131 of the actuator plunger 126. Upon deposit of proper coinage into the coin slide, the user is able to push the coin slide plunger 142 forward, toward the cabinet. During the forward movement, an upwardly projecting pusher plate contacts the forward face of the plate 131 of the actuation assembly and the entire plunger assembly 126 is pushed rearwardly until the front end of the upper plate 128 clears the lowermost flat article to be dispensed. At this point, the lowermost flat article located in the chimney hopper, preferably having a length greater than that of the plate 130 and which was resting atop the upper plate 128, falls onto the upper surface of the pusher plate 130. The user then retracts the plunger of the coin slide causing the vertical plate to move forwardly into a confronting position with depending bend 133 which moves the plunger assembly forward. As the plunger assembly moves forward, the front edge of upper plate 128 imparts lateral translating force to the edge of the flat article. The middle plate, upon which the article is carried, translates within the leg of the T-slot over the surface of the underlying stop plate 116 and until the coin slide 16 reaches its home position/starting point. Further forward motion of the coin slide is checked when the rearward edge of the stop plate 116 contacts notch 135 of the actuator assembly. By this point the coin slide reaches the home position, the front edge of the vended flat article has been pushed out of the front of the cabinet through a corresponding vending slot 44.

An alternative actuation device is illustrated in FIGS. 14–16. Positioned to the left of the mechanical coin slide 140 and covering the adjacent actuation aperture 42 is the coverplate 144 for an electric powered motorized version for vending a stack of flat items. The cover plate 144 incorporates a vend indicator light 145 that signals the user regarding the vend status of that particular actuator. The motor unit 146 is mounted on motor bracket 148 which in turn, is mounted to the cabinet through aperture 42. A cam arm 148 connected to the motor 146 and is secured within a slot in the mounting bracket. The arm which rotates eccentrically, converts the rotational movement of the motor to translational movement so that the pins 150 and 152 respectively can engage, on either side, the depending bends 133 and 131 of said actuator plunger assembly. Electrical power and control signals are communicated to the motor and front panel light indicator 145 via cabling 149. An electric vendor motor and housing suitable for use in this invention is described in U.S. Pat. No. 5,172,605, the subject matter thereof being incorporated herein by reference. The motor unit/housing 146 includes electric motor and operational circuitry, a plurality of interlinked spur gears and a non-circular drive shaft. This drive shaft is connected to the eccentric actuator shaft 147 to impart reciprocating movement to the actuator assembly.

The motor housing 146 is attached to the bracket 148 with screws passing through spaced holes 172. It should be apparent to the skilled operator that due to the wide variety of flat article dimensions ranging from cardboard encased stickers to paperback books, it is not possible to entirely standardize the dimensions of the motor mounting bracket, etc. Such dimensional details are governed by intended use.

An electronically actuated and controlled vending assembly embodiment substituting for the above-described manually operated coin slide is described below. However, first, an anti-tampering adjunct is described.

A further structure incorporated into the vend cabinet is an anti-tampering, anti theft card gate assembly. The illustrated gate assembly 150 preferably is attached to the chimney hopper to cover the exit opening 117. The mounting bracket 152 is affixed by screws or spot welding at tabs 154. The torsion spring 159 loaded doctor gate 156 is pivotally mounted to the bracket 152 by a hinge pin 158 which is mounted on hinge support tabs 155. The doctor gate projects below the mounting bracket to loosely abut the tray 108. As a result of the mounting bracket, the pivot arc of the gate is limited only to the forward direction. Thus, during the process of vending, a flat article from the associated chimney hopper will pivotally displace the gate until the vend is complete. Once the vended article clears the gate 156, it pivots to its exit opening blocking position. A mischievous user cannot, therefore, insert a blade or other object to either obtain a free vend or to damage the articles at the bottom of the chimney hopper. As described, the anti-tampering gate is affixed to an associated hopper. However, with minor modification, the bracket could be mounted to the front panel to block any access to the interior of the machine through vending slots 44. Likewise, the anti-tampering assembly may be in to form of a simple flap of resilient sheet material (plastic or metal) affixed with bracket nuts on each side of the chimney hopper front. The material used for the flap should exhibit resiliency/modulus of elasticity and be of a thickness to flex outwardly during article vending thereby permitting the flat article to pass under the flap while preventing access to the chimney and its content from the front.

The particular arrangement of machines and their content is at the choice of the operator merely by substituting support trays, chimney hoppers, and actuator plunger assemblies. The simple above-described options associated with machine conversion permits one basic machine to be used to dispense variety of flat articles of different sizes and thickness.

The invention, as noted, contemplates electronic, and combination mechanical and electronic versions. In order to utilize an electronic version, a separate electronic control unit 200 is required. Such a control unit may be linked to one flat article vending machine or a plurality of such machines which in turn may be rack mounted. FIG. 18 represents a version of an electronic central control unit contemplated for use with this invention. The unit primarily comprises three segments; a main base cabinet 260, a top unit 280 and a hinge-mounted, latchable, front door panel 300. These segments are formed from a high strength material such as 16-gauge steel to provide adequate structural integrity and strength. Preferably, the steel sheeting is powder coated to minimize deterioration from adverse environmental factors and vandalism. Suitable non-metal materials possessing desirable functional attributes of powder coated steel (e.g. selected polymer compositions and composites) may be substituted for the steel.

The main cabinet 260 provides the rigid and strong housing for the power and control units necessary for actuation of the invention as well as the means for securing the bulk vending machine rack stands in assembly form. The cabinet houses the microprocessor-containing circuit board, the main controller bracket 340 mounted to an internal electrical component vertical support panel 360, currency acceptor components, mechanical and electrical connections for the currency acceptor components, and the coin vault. It also features rack-securing slots 370 formed in each sidewall. The slots 370 are relatively long to facilitate vertical height adjustment of the rack stands relative to the cabinet. The support panel 360 is dimensioned to correspond to the interior width of the cabinet 260 to be nested therein. In the present illustrated embodiment, the panel 360, is secured to the interior side walls of the cabinet 260 by mating a series of projecting pins 380 to a plurality of corresponding complementary L-slots 400 formed on peripheral flange 420 of the support panel 360.

The base of the cabinet 260 contains a lower chamber 410 separated by a steel ceiling panel 520 from the upper portion of the container 260. The coin vault 430 is a steel box for housing the vending assembly coin box 440. As illustrated, the box forming the vault 430 includes two steel sidewalls that extend between the ceiling panel 520 and the floor of container 260. The side panels are physically attached to both the ceiling panel 520 and a pair of upstanding, parallel support beams 500 affixed along the container floor 460. The support beams 500 reinforce the floor 460 and raise the coin box vault 430 above the floor of the container. The vault translatably receives the coin box 440 and may include features such as tracks or some other friction reducing means to facilitate translation of the box from the vault.

The vault-ceiling panel 520 is permanently attached to the interior of the cabinet 260 to define an upper section and the lower, vault sections. Therefore, it also incorporates a coin communicating feedthrough aperture 540 for communication of coins from the currency acceptor into the underlying coin box 440. Finally, the ceiling panel 520 includes a means for locking the coin box within the vault. In the illustrated embodiment, a locking combination is established by a lock lug receiving slot 560 dimensioned to receive a lug from key actuated lock 58 established in the coin box. This arrangement provides a means to prevent unauthorized access to and removal of the coin box from the vault even when the front door 300 is open.

The container 260 also includes features to facilitate secure positioning of central control unit 200. Reinforced, threaded holes 620 located near the front of and at each side of the cabinet floor 460 are adapted to receive threaded leveler guides 600 that provide height adjustability. The back of the cabinet features wheel-receiving recesses for retaining shaft mounted roller wheels 640. A shaft 650 passes through apertures 660 formed along the back bottom portion of the lower chamber 410, through the wheels and is secured with a plurality of locking rings 670. The back of the cabinet 260 also includes a feedthrough for electrical power cord and a handle 680 for grasping and tilting the unit 120 to roll on the wheels.

The top unit 280 of the central control unit 120 features a hollow display weldment 700, a dome top 720, a display front 740 and a display lens 760. The top unit 280 mates with main cabinet 260 when pins 380 pass through pin holes 780. A threaded lock rod 820 compression clamps the top 720 to weldment 700 and to the main cabinet 260 by securing it in feedthrough 800 formed in the top of the cabinet 260. In this manner the individual segments are combined to form a secure unitary structure but also permit stacking of additional top units above the main cabinet, when desirable. That feedthrough also accommodates an electrical conduit from the main cabinet to the top unit. The top unit may incorporate a static (illustrated) or dynamic display to attract potential purchasers or to provide advertising. As illustrated the top unit includes a light 840 and light fixture 860 that illuminates a translucent display lens 760 framed by the display front 740.

Referring to FIG. 21, the electrical component mounting panel 360 provides secure mountings for the electrical junction box 880 which houses circuit breaker 900, transformer 920, and electrical outlet 940 along with associated power cord 950, wires, and pin connector 960. The junction box 880 includes a power cord feedthrough protected by bushing 890 and is covered by a panel 980 which also serves as a seat for the circuit breaker 900. The main pin connector 1000 is connected to power pin connector 960 to provide electricity to the control panel and to communicate electrical signals to the shelf pin connector harnesses 1020 seated in pin harness openings 1040 located proximate to each of the corners of the panel 360. A longitudinal hinged, L-bracket 1060 is welded vertically only the front face of the panel next to centrally located permanent magnet 1080, both of which serve to secure the currency acceptor unit 220.

Figure 22:
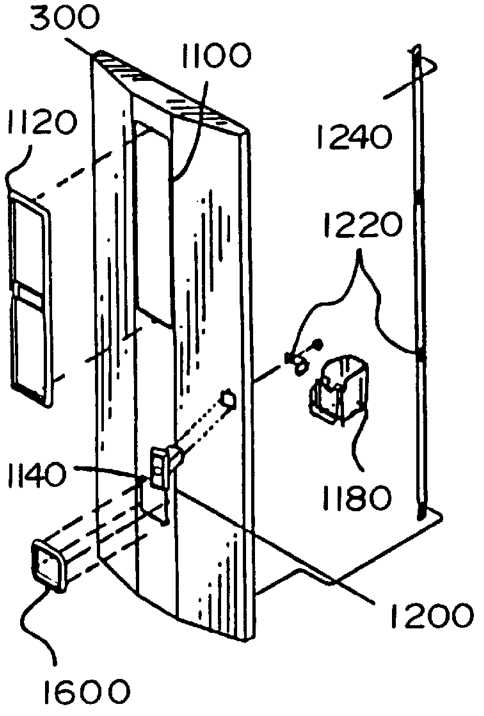
FIG. 22 is an assembly view of the front door panel and latching arrangement of the central control unit embodiment depicted in FIG. 18.

In FIG. 22, the hinge mounted steel door 300 that secures the main cabinet 260, is illustrated. Steel door 300 includes a central vertically oriented currency acceptor aperture 1100 which is framed by a coin acceptor bezel 1120. Disposed below the aperture 1100 is a second aperture 1140 framed by coin return bezel 1160 that serve to secure coin return cup 1180 under the currency acceptor unit 220. The door also includes a T-handle lock 1200 that rotates cam 1220 that translates a locking latch bar 1240 to engage complementary lug structures within the cabinet 260.

Figure 23:
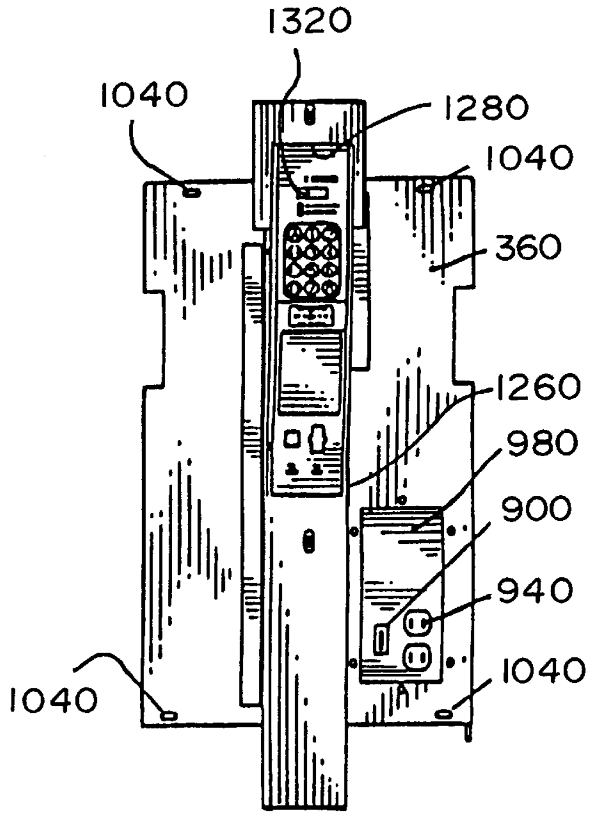
FIG. 23 is a front view of a control unit housing of the embodiment of the electronic controller and keypad as mounted on a panel according to FIG. 21 in accordance with one embodiment of the invention as depicted in FIG. 18.
Figure 24:
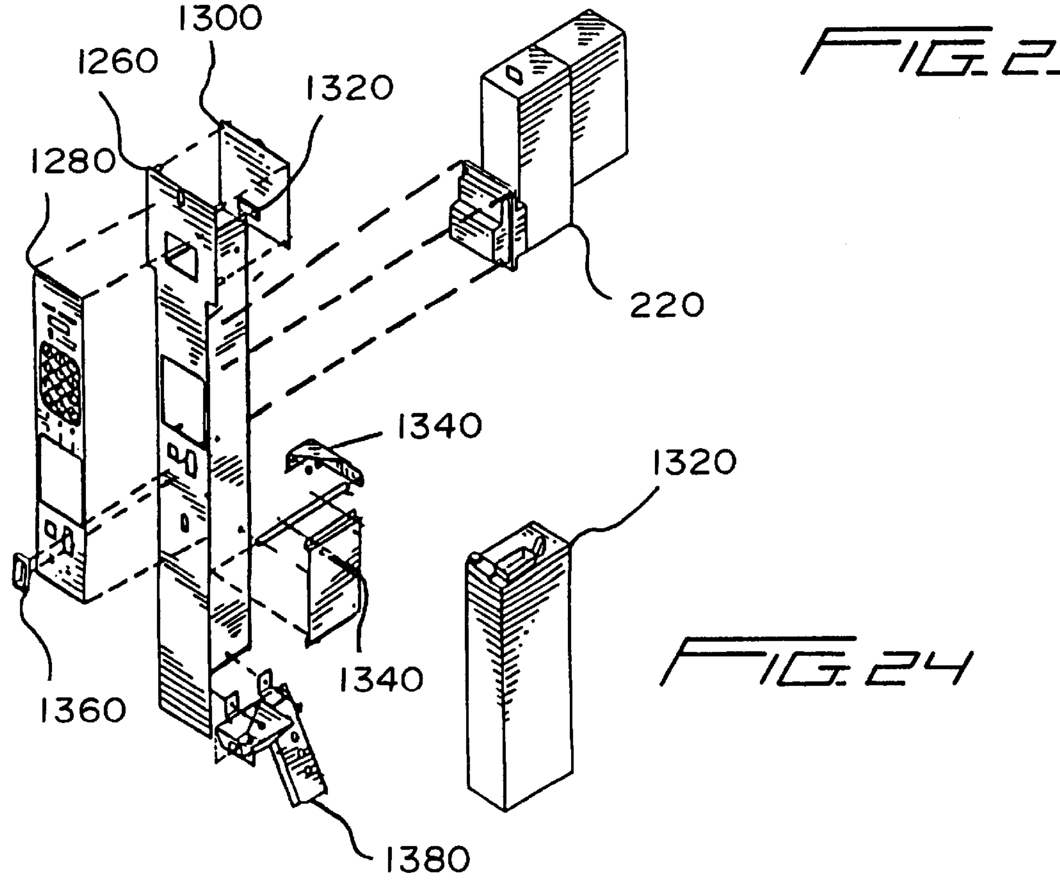
FIG. 24 is a perspective assembly view of an electronic controller and keypad including currency acceptor elements in accordance with the embodiment according to the embodiment depicted in FIG. 18.

A detailed view of the currency acceptor mechanism is illustrated FIGS. 23 and 24. The currency acceptor, in the illustrated embodiment includes both a bill validator of the type disclosed in U.S. Pat. No. 4,880,096 and a coin acceptor of the type disclosed in U.S. Pat. No. 4,739,869 and its cognate Canadian Patent 1,251,862 (the subject matter of all being incorporated herein by reference). The L bracket 1260 secures the keypad 1280 on its front and preferably is mounted to the support panel 360 along bracket 1060 in a manner to permit pivoting for easy access to the supported components. It also secures the microprocessor-controlled circuit board 1300 on its backside. The circuit board 1300 includes an electronic display (e.g., Liquid Crystal or LED) 1320 facing outward for visual access from the front. The currency acceptor elements include the bill acceptor mounted to the L bracket 1260 and coin acceptor 1320 mounted to the L bracket 1260 with the bracket 1340. Preferably, the bracket 1340 is formed of a ferrous metal so that it is releasably attracted to the magnet 1080 attached to the support panel 1360. The coin acceptor 1320 is in coin communication with coin receiving slot member 1360 mounted on the front of the bracket 1260. The coin dispensing chute 1380 is disposed below the coin acceptor 1320 to pass coins from the acceptor to the coin box in vault 440.

Figure 25:
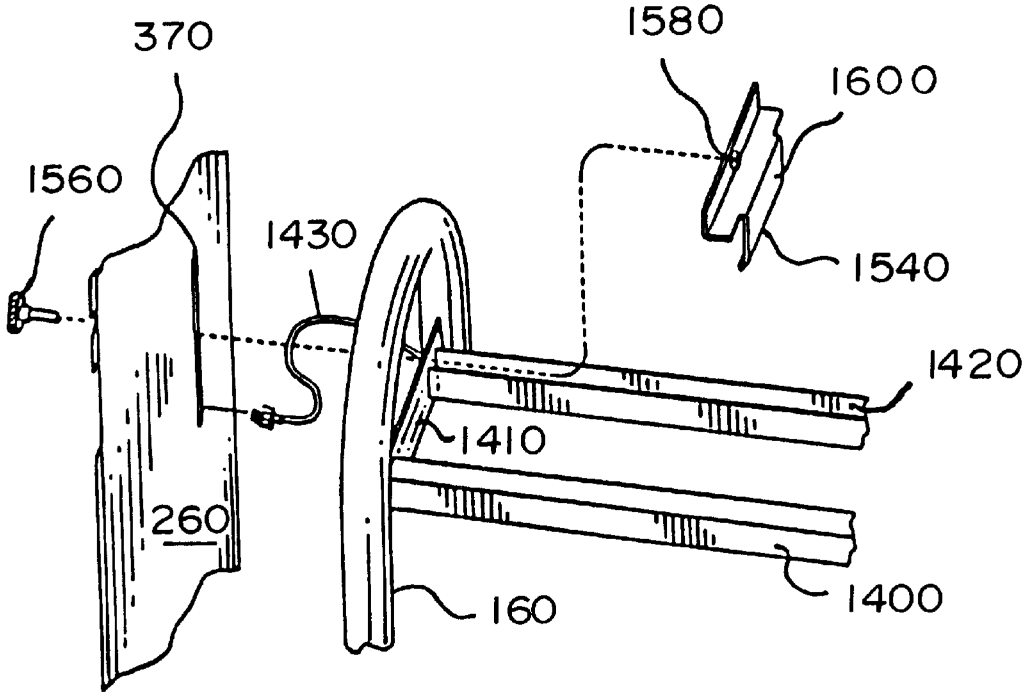
FIG. 25 is a perspective partial assembly view of a flat article vendor machine stand and central control cabinet according to the invention.

Turning now to a rack attachment structure, FIG. 25 illustrates an exemplary stand 160 and respective elements for attaching a flat article vending machine of this invention to the controller 200. The stand 160 may be of any conventional type but, preferably, to accommodate the wiring and harnesses required for the instant invention, it is a modified form of the stand depicted in Design Patent 381,169 for a stand, the disclosure of which is incorporated by reference herein. The stand 160 which is capable of supporting multiple vending machines of different types, features at least one channel 1420 formed in one of the lateral shelf pair members to recess wire/harness cable 149. A properly located electrical cable feedthrough bore is formed in the flat article vendor cabinet floor 30. Following positioning of a machine on a shelf, machine bolts are preferably threaded through the cabinet floor to the underlying shelf. Because the bolts are secured from the inside of the cabinet 12, absent significant force, the machine base cannot be dislodged from the shelf and where integrated cable protecting channel caps are used, the cabling cannot be accessed.

When the rack stand 160 is moved (caster roller facilitated) to a position contiguous to slots 370 in cabinet 260, the wire harness cable 149 is passed through slot 370 for connection to the appropriate wire pin harness 1020 and the stand clamp bracket is aligned with the slot. The clamping knob 1560 is screwed from the inside of the cabinet 260 through the slot 370 and into the mating threaded hole 1580 formed in the stand clamp 1540. The downwardly projecting engagement lip 1600 compressibly clamps over the stand cross support strut 1410.

While many of the components and structures used to establish a working version of the electronic version of the invention are unique, Table 2 identifies off-the-shelf components that can be used:

TABLE 2

| Component Description | Manufacturer/Supplier |
|---|---|
| BA32R Bill Acceptor | Coinco |
| 9302-GX Coin Changer | Coinco |
| PC Controller/Display 407516 | Coinco |
| Shelf cabling | Mercury Electronics |
| Pin connectors 43025-1000, 43030-0007, 70107-0036, 70066 50-57-9402, 70058 16-02-0102, 16-02-0114, 43020-1000, 43031-0007 | Molex |
| Pin connectors 610601-1, 640917-1, 2-520102-2, 2-520183-2 2-520181-2, 2-520273-2, 53241-2, 31894 | AMP, Inc. |
| Pin connector SVT 17534 | Belden Electronics, Inc. |
| Bulk Vendor Motors Part D27-2406-3 | Merkle-Korff industries, Inc. |
| LED SSI LXH1090SRC/C | Lumex Opto/Components, Inc. |

The next steps relate to electronic operation. The currency acceptor (as illustrated the bill acceptor and the coin changer) must be initialized. Initially, some coins should be placed in the changer, but under normal operating conditions, the coin changer is self-filling.

To set the machine, it is necessary to unlock and open the door 300 of the central control unit 200. To access the control board and currency acceptors of the main control panel, pivot the hinged panel to overcome the magnetic force holding it in the closed position. To program the unit, it is first necessary to enter the service mode by pressing and releasing the mode button located on the control board. (Toggling the mode button again will exit the service mode and return the control board to the sales mode.) The unit is provided with a fail-safe feature to prevent accidents. If the programming sequences are not initiated within 25 seconds as detected by an absence of keypad activity, the control board automatically reverts to the sales mode.

The first display is of diagnostic indicators on the digital display. These will be displayed until entry of subsequent programming functions. Such diagnostics include the number of configured motors, multi-drop bus errors, defective or jammed motors, etc.

Examples of various programming functions, include for example, the following permanent modes:

1) Coin Dispense—This mode is used to empty the coin tubes of the changer.
2) Motor Count.—This mode displays the number of motors configured corresponding to the number of individual electronic actuators 14 connected to the controller;
3) Accounting—In this mode the total vend count and the total cash count is displayed, preferably both as cumulative totals which are not resettable to both minimize tampering and facilitate tracking the total number of vends/money collected by each respective unit.
4) Setting Prices—This mode provides for operator flexibility by allowing each machine to be set at a unique vending price point. After identifying a particular machine or machine actuator, the vending actuation price is set by pushing the "↑" arrow key to increase the price displayed on the LCD or LED display and the "↓" arrow to decrease the price.
5) Test Vend—This is a currency-less transaction mode employed to confirm proper operation of the electrical connection between the selector and a select actuator. Dispensing of a product from the appropriate vending slot indicates a successful test. Failure is indicated on the display.

The control pad also permits an operator to customize each vending machine assembly by setting the following optional modes:

1 Force Vend—When activated, the Force Vend requires a purchase to be made once the customer has inserted money into currency acceptor. No change is returned until a selection is entered on the keypad. When deactivated, the customer may push the coin return and receive money back in change without making a purchase.

2. Bill Escrow—This mode determines if the customer will receive the original currency bill or change. It is related to the Force Vend option insofar as, when activated, the Force Vend mode overrides the Bill Escrow mode.

3. Multi-Vend—This optional mode permits the operator to set a price point at which change is automatically returned to the customer following a vend. Assuming a customer makes a purchase but does not use all of the deposited money deposited in the machine, the amount remaining in "escrow" is displayed and may be used to make an additional purchase or, at the election of the customer, can be retrieved the remaining balance by pushing the coin return button. The escrowed amount will also be returned automatically after 25 seconds if no subsequent action (selection or deposit) is made.

5. Free Vend—This option puts the entire assembly in a free play operational mode and over-rides any price settings.

An electronic flat article vending assembly of the type contemplated by this invention may also incorporate a number of various options to facilitate troubleshooting, minimize vandalism, and assist with data collection and inventory control.

Each unit may include an electronic optical or electro-optical detector associated with the dispensing opening of each merchandise wheel to confirm the presence or absence of a vend. A vend failure can be caused by any number of problems that face bulk vending machine operators using conventional machines. However, jamming problems etc. can be detected, confirmed, and corrected much more quickly given the appropriate telemetry which can be accessed on site or remotely. For example, if a product jams in the hopper exit, it will not only prevent a vend but may prevent the selected vendor motor from turning. This failure could be detected using the vend confirmation sensor and relayed to the operator by on-site interrogation or automatic interrogation and remote information transmission using a telemetry transceiver system located in the central control unit. Such information transmission may relate to the entire assembly or may address individual units. Transmitted information/telemetry may include the operability of the machine, the number of vends, the amount collected since the last refill, etc. which is useful for maintenance and inventory control.

For example, as in the case of conventional machines, coins can become jammed in the coin acceptor which must be dislodged to permit full operation. This sub-optimal condition may be detected by the machine and relayed to an appropriate central control.

Another concept relates to security. A digital camera may be installed in the domed top section that allows for period scheduled recordation of traffic about the unit and may be associated with sensors to activate upon the occurrence of any unauthorized or unlawful activity involving the machine. Thus, machine is capable of storing or transmitting information that provides the operator with demographic characteristics of the user population and/or enhanced security.

The following discussion concerns the electronic accounting or audit system and method contemplated to be used with the above-described systems. As contemplated, the auditing system used in connection with the invention is fully automated and permits data gathering with complete cash and audit detail reporting capabilities. Once established, the audit accounting system provides detailed information about the vending activity of the entire system as well as about the individual bulk vending machines with which it is associated as well as particular electronically controlled vending actuators contemplated by the invention. Typically, the auditing system will enable production of reports, for example, of total money in the coin changer, cash box, and/or bill acceptor, the total number of vends by the system, per machine, per actuator, and by selection. So long as fundamental system information is present, e.g., the machine serial number, the identification of the bulk vending machines the name of the location, the route number and the time increment (day, week or month), the operator may retrieve the information on location or remotely through an appropriate telecommunications link.

Preferably, for security reasons and consistent reporting operations, the audit function are accessible to only Key operator personnel and the software is designed to permit access to any one site one at one time. The software is installable on a conventional PC meeting minimum operating requirements and is provided with an appropriate link for receiving the data from the central control units. There are several interrogation hardware options including hard wiring to the audit computer, telephone-line/modem linkage, radio transceivers, satellite communication uplink-downlink hardware, and even a hand held portable probe including an infrared transmitter or a serial port. Once the data is transferred, the particulars of its use depend on the specifics of the operator's requirements and therefore, are not detailed here.

The above-described embodiments have been directed to currency receipt only. However, the invention contemplates other redemption faculties. For example, the invention can be used for redeeming tickets or other transactable media such as that used in entertainment arcade centers, at charity events, and the like.

Given the foregoing, variations and modifications to the invention should now be apparent to a person having ordinary skill in the art. These variations and modifications are intended to fall within the scope and spirit of the invention as defined by the following claims.

We claim:

1. A flat article vending machine, comprising:

a cabinet defining an interior of selected dimensions bordered by a base, top, side walls, and an apertured actuator receiving panel adapted to receive and retain at least one vending actuator, said apertured panel being located proximate to said cabinet base and containing at least one vending slot and a pivotable door;

a panel receiving and securing guide disposed in the interior of said cabinet on at least one of said side walls, said panel guide being disposed and extending above said apertured panel;

a retractable locking arm slidable between a depressed locking position and a raised unlocked position, said locking arm being located below said panel receiving and securing guide and behind said apertured panel, said slidable locking arm lockingly engageable with said pivotable door; and a removable panel lockable to said cabinet of dimensions selected to abut said side walls, said top, and said apertured panel, said removable panel having a lower edge that is receivable in said panel receiving and retaining guide and translatable to abut and coact with said slidable locking arm and lockingly engage said pivotal door.

2. The flat article vending machine according to claim 1 where said apertured panel includes a plurality of actuator apertures.

3. The flat article vending machine according to claim 1 where said apertured panel includes a piano hinge connecting said pivotable door with said base.

4. The flat article vending machine according to claim 1 where said removable panel includes a display cover and a forwardly projecting ledge, said display cover being interference fit over said panel and retained by said ledge.

5. The flat article vending machine according to claim 4 where said display cover includes a flat article display pocket for supporting a plurality of displays.

6. The flat article vending machine according to claim 2 further including an flat item dispensing actuator assembly including an coin operated slide actuator located in an actuation aperture and an actuator pusher for communicating flat article contained in said machine to exit the vending slot.

7. The flat article vending machine according to claim 1 further including an electrically actuated, motorized flat item dispensing actuator assembly and an actuator pusher for communicating flat article contained in said machine to exit the vending slot.

8. The flat article vending machine according to claim 1 further including a chimney hopper having an upper loading zone, a middle storage and retention zone, and a lower dispensing zone, said chimney being defined by two opposing side panels to define a column of selected width for retaining and nesting a plurality of stacked flat articles, said middle storage and retention zone of said column restricting lateral movement of said flat articles retained therein, said upper loading zone having defining a beveled front opening to facilitate front loading and stacking alignment of flat articles in said chimney hopper; and said lower dispensing zone including an opening for permitting flat articles to exit the chimney hopper laterally upon application of laterally directed force.

9. The flat article vending machine according to claim 1 further including an anti-tampering means includes a gate mounted to a bracket disposed on said turn-ins and above said turn-in notches, said gate being pivotable in an arc from a first depending blocking position to a raised dispensing position upon exit of a flat article from the chimney hopper.

10. A pre-loadable magazine for a flat article dispensing machine, comprising, a chimney hopper having an upper loading zone, a middle storage and retention zone, and a lower dispensing zone, said chimney being defined by two opposing side panels, each side panel including a turn in to define a column of selected geometric cross-section for nesting a plurality of stacked flat articles;

said middle storage and retention zone of said column restricting lateral movement of said flat articles retained therein;

said upper loading zone having defining a beveled front opening formed by two opposing sides, each side incorporating a flared turn out flange bordering said beveled front opening where said upper loading zone facilitates front loading and stacking alignment of flat articles in said chimney hopper; and said lower dispensing zone including an opening for permitting flat articles to exit the chimney hopper laterally upon application of laterally directed force.

11. The chimney hopper according to claim 10 where the chimney hopper is permanently mounted on a modular support tray including means to accommodate a select number of actuator means for applying laterally directed force.

12. The chimney hopper according to claim 10 further including an open bottom where the front turn-ins include a notch formed in the lower zone contiguous to the open bottom, said turn-in notch having a depth approximating the thickness of a flat article being dispensed from the machine.

13. The chimney hopper according to claim 12 where a plurality of projecting means projects from the lower zone for positionally securing the chimney hopper on a support surface.

14. The chimney hopper according to claim 13 in combination with a support tray including a T-shaped opening and receiving means disposed proximate to said T-shaped opening for cooperating with said projecting means to position the hopper on the tray.

15. The chimney hopper according to claim 14 further including an anti-tampering means disposed in front of said notches.

16. The chimney hopper according to claim 15 where the hopper is formed from aluminum and includes an open top and where said anti-tampering means includes a gate mounted to a bracket disposed on said turn ins and above said turn in notches, said gate being pivotable in an arc from a first depending blocking position to a raised dispensing position upon exit of a flat article from the chimney hopper.

17. An electronic flat article vending machine assembly, comprising:

a cabinet defining an interior of selected dimensions bordered by a base, top, and side walls, an apertured actuator receiving panel adapted to receive and retain at least one electrically actuated vending actuator; and a vending slot;

a hopper means for storing and retaining flat articles located in the cabinet interior, said hopper means including a support and actuation tray for supporting a select plurality of hopper chimneys within said cabinet, where the number of chimneys corresponds to the number of actuators and vending slots associated with said actuation tray and where each of said actuators comprises a reciprocating electrical vending actuating assembly including a plurality of plungers disposed within said cabinet, one each associated with a chimney of said hopper means to push a flat article from the chimney to the vending slot; and a control unit for transmitting an electronic actuation signal to the electrical vending actuation assembly said control unit being in electronic communication with said cabinet.

18. The electronic flat article vendor of claim 17 where said control unit is separate from the cabinet and said cabinet further includes a retractable locking arm slidable between a depressed locking position and a raised unlocked position, said locking arm lockingly engageable with said pivotable door;

a panel receiving and securing guide disposed in the interior of said cabinet on at least one of said side walls, said panel guide being disposed and extending above said apertured panel;

a removable display panel assembly of dimensions selected to abut said side walls, said removable display panel assembly including an interference fit display panel cover and display supporting pocket, said removable display panel assembly defining having a lower edge that is receivable in said panel receiving and retaining guide, being translatable therein to abut and coact with said slidable locking arm and lockingly engage said pivotal door.

19. The electronic flat article vendor of claim 17 where the cabinet further includes a chimney hopper having an upper loading zone, a middle storage and retention zone, and a lower dispensing zone, said chimney being defined by two opposing side panels, each side panel including a turn in to define a column of selected geometric cross-section for nesting a plurality of stacked flat articles, said middle storage and retention zone of said column restricting lateral movement of said flat articles retained therein, said upper loading zone having defining a beveled front opening formed by two opposing sides, each side incorporating a flared turn out flange bordering said beveled front opening where said upper loading zone facilitates front loading and stacking alignment of flat articles in said chimney hopper; and said lower dispensing zone including an opening for permitting flat articles to exit the chimney hopper laterally upon application of electrically actuated laterally directed force.

20. The chimney hopper according to claim 19 where the anti-tampering means includes a gate mounted to a bracket disposed on said turn ins and above said turn in notches, said gate being pivotable in an arc from a first depending blocking position to a raised dispensing position upon exit of a flat article from the chimney hopper.

21. A display panel assembly for a vending machine, comprising:

a mounting panel including means for secure mounting said mounting panel to a vending machine;

a display panel for mounting onto said mounting panel;

means for attaching and frictionally engaging said display panel to said mounting panel where said display panel is retained by said mounting panel; and pocket means mounted on said display panel for receiving and positionally locating a select display at a select position on said display panel;

where said mounting panel includes an upper ledge and a lower ledge each capable of cooperating with said vending machines to secure said mounting panel thereon where said ledges project forwardly from said mounting panel and define a display receiving area to permit said display cover to be interference fit on said mounting panel and retained by said ledges.

22. The display panel assembly according to claim 21 where said mounting panel further incorporates a first cooperating element for locking said vending machine.

23. An flat article vending machine assembly, comprising:

a cabinet adapted to receive and retain a modular hopper element for storing flat articles until dispensed by operation of a select number of vending actuators through a corresponding number of associated vending slots and a display panel assembly;

said hopper including a flat support tray and at least one chimney hopper being associated with at least one vending actuator, said chimney hopper having an upper loading zone, a middle storage and retention zone, and a lower dispensing zone, said hopper defining a vertical column receiving, retaining and vending, a plurality of stacked flat articles one at a time from the vending machine upon actuation thereof;

said display panel assembly including a mounting back panel and a display panel for mounting onto said mounting back panel to be retained thereby and said display panel includes a strip attached thereto for sandwiching between said display panel and said mounting back panel, said strip forming a receiving pocket for receiving and positionally locating a select display at a select position on said display panel, said receiving pocket being adapted to display subject of the content of a hopper located therebehind.

24. The flat article vending machine assembly according to claim 23 where said vending actuators are electrically actuated and further including a control unit for transmitting an electronic actuation signal to the electrical vending actuators.

25. The flat article vending machine assembly according to claim 24 where there are at least two hopper chimneys within said cabinet, where the number of chimneys corresponds to the number of actuators and each hopper is associated with its own vending slot in article communication with said support tray and where each of said actuators comprises a reciprocating electrical vending actuating assembly including a plurality of plungers disposed within said cabinet, one each associated with a chimney of said hopper means to push a flat article from the chimney to the vending slot.

* * * * *